United States Patent
Wang et al.

(10) Patent No.: US 8,706,346 B2
(45) Date of Patent: Apr. 22, 2014

(54) ROBUST MOTOR TORQUE PERFORMANCE DIAGNOSTICS ALGORITHM FOR ELECTRIC DRIVE SYSTEMS IN HYBRID VEHICLES

(75) Inventors: Wei D. Wang, Troy, MI (US); Brian A. Welchko, Torrance, CA (US); Kevin P. Houle, Flint, MI (US); Darren Crewes, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 12/916,719

(22) Filed: Nov. 1, 2010

(65) Prior Publication Data

US 2012/0109431 A1 May 3, 2012

(51) Int. Cl.
*B60L 15/20* (2006.01)
*G06F 19/00* (2011.01)

(52) U.S. Cl.
USPC .......... 701/29.9; 701/22; 701/30.1; 701/31.3; 701/30.8; 701/29.2; 180/65.21; 903/902

(58) Field of Classification Search
USPC ............... 701/22, 29.9, 29.2, 30.1, 30.8, 31.3
See application file for complete search history.

(56) References Cited

U.S. PATENT DOCUMENTS

| | | | | |
|---|---|---|---|---|
| 5,452,207 A * | 9/1995 | Hrovat et al. | ...................... | 701/1 |
| 6,150,780 A * | 11/2000 | Young et al. | .................. | 318/270 |
| 6,157,156 A * | 12/2000 | Tsuruta | .......................... | 318/609 |
| 6,411,052 B1 * | 6/2002 | Mir et al. | ...................... | 318/434 |
| 7,117,965 B2 * | 10/2006 | Yatabe et al. | ............ | 180/65.235 |
| 7,203,578 B2 * | 4/2007 | Kuang et al. | .................... | 701/22 |
| 7,212,891 B2 * | 5/2007 | Sato | ................................ | 701/22 |
| 7,427,849 B2 * | 9/2008 | Kaneko et al. | ................ | 318/801 |
| 7,670,252 B2 * | 3/2010 | Wu et al. | ........................... | 477/3 |
| 7,755,310 B2 * | 7/2010 | West et al. | .............. | 318/400.02 |
| 8,112,194 B2 * | 2/2012 | Buur et al. | ..................... | 701/31.8 |
| 8,155,815 B2 * | 4/2012 | Cawthorne et al. | ......... | 701/33.7 |
| 2002/0116101 A1 * | 8/2002 | Hashiba et al. | ................. | 701/22 |
| 2003/0163296 A1 * | 8/2003 | Richards | ........................ | 703/14 |
| 2005/0116677 A1 * | 6/2005 | Tsuruta et al. | ............... | 318/610 |
| 2005/0197751 A1 * | 9/2005 | Koike | .............................. | 701/22 |
| 2005/0255964 A1 * | 11/2005 | Heap et al. | ........................ | 477/3 |
| 2005/0256629 A1 * | 11/2005 | Tao et al. | ......................... | 701/87 |
| 2007/0213167 A1 * | 9/2007 | Yamazaki | ..................... | 475/263 |
| 2008/0119320 A1 * | 5/2008 | Wu et al. | ............................ | 477/5 |
| 2008/0281480 A1 * | 11/2008 | Egami et al. | ..................... | 701/22 |
| 2009/0042688 A1 * | 2/2009 | Itou et al. | ........................... | 477/3 |
| 2009/0066281 A1 * | 3/2009 | West et al. | ..................... | 318/434 |
| 2009/0111640 A1 * | 4/2009 | Buur et al. | ........................ | 477/3 |
| 2009/0118077 A1 * | 5/2009 | Hsieh et al. | ....................... | 477/3 |

(Continued)

OTHER PUBLICATIONS

Xu et al., Direct torque and flux regulation of an IPM synchronous motor drive using variable strucutre control approach, 2007, IEEE.*

(Continued)

*Primary Examiner* — Thomas Black
*Assistant Examiner* — Sara Lewandroski

(57) ABSTRACT

A method to control a powertrain having an electric motor includes monitoring a torque command to the motor, predicting a motor torque for the motor based upon the torque command, monitoring an actual motor torque of the motor, comparing the actual motor torque to the predicted torque, and indicating a motor fault when the actual motor torque and the predicted torque differ by more than a calibratable threshold.

15 Claims, 2 Drawing Sheets

(56) References Cited

U.S. PATENT DOCUMENTS

| | | | |
|---|---|---|---|
| 2009/0153087 A1* | 6/2009 | Lim et al. | 318/432 |
| 2011/0144838 A1* | 6/2011 | Matthews et al. | 701/22 |
| 2011/0163704 A1* | 7/2011 | Wang et al. | 318/400.21 |
| 2011/0184602 A1* | 7/2011 | Severinsky et al. | 701/22 |
| 2011/0288699 A1* | 11/2011 | Jang et al. | 701/22 |
| 2011/0303479 A1* | 12/2011 | Mukai et al. | 180/444 |
| 2012/0006612 A1* | 1/2012 | Wilson-Jones et al. | 180/446 |
| 2012/0072066 A1* | 3/2012 | Kato et al. | 701/22 |
| 2012/0078456 A1* | 3/2012 | Hakumura et al. | 701/22 |

OTHER PUBLICATIONS

Dahb et al., MOdel based design of inverter power supply, 2009, ICROS-SICE.*
Le-Huy, Modeling and Simulation of Electrical Drives using MATLAB/Simulink and Power System Blockset, 2001, IEEE.*
Syed et al., Active Damping Wheel-Torque Control System to Reduce Driveline Oscillations in a Power-Split Hybrid Electric Vehicle, Nov. 2009, IEEE.*

* cited by examiner

US 8,706,346 B2

ROBUST MOTOR TORQUE PERFORMANCE DIAGNOSTICS ALGORITHM FOR ELECTRIC DRIVE SYSTEMS IN HYBRID VEHICLES

TECHNICAL FIELD

This disclosure is related to control of a powertrain including an electric motor.

BACKGROUND

The statements in this section merely provide background information related to the present disclosure and may not constitute prior art.

Powertrains are known to include different torque generative devices. Electric drive powertrains and hybrid drive powertrains can utilize an electric motor or motors to provide torque to the powertrain. Motors can be utilized additionally in a regeneration mode to utilize a torque to regenerate an energy storage device.

Monitoring the torque output of a motor is desirable in controlling an associated powertrain, for example, enabling a comparison of a torque requested of the motor to an actual motor torque. Torque security describes monitoring the various torque generative devices and maintaining a desired torque to the powertrain to meet a demand for output torque by the operator of the powertrain or a demanded output torque. On-board diagnostics additionally monitor operation of the motor and determine whether the motor is operating within normal parameters, and on-board diagnostics can indicate a requirement to service the motor or shut down the motor based upon indications of the on-board diagnostics.

SUMMARY

A method to control a powertrain having an electric motor includes monitoring a torque command to the motor, predicting a motor torque for the motor based upon the torque command, monitoring an actual motor torque of the motor, comparing the actual motor torque to the predicted torque, and indicating a motor fault when the actual motor torque and the predicted torque differ by more than a calibratable threshold.

BRIEF DESCRIPTION OF THE DRAWINGS

One or more embodiments will now be described, by way of example, with reference to the accompanying drawings, in which.

DETAILED DESCRIPTION

Figure 1:
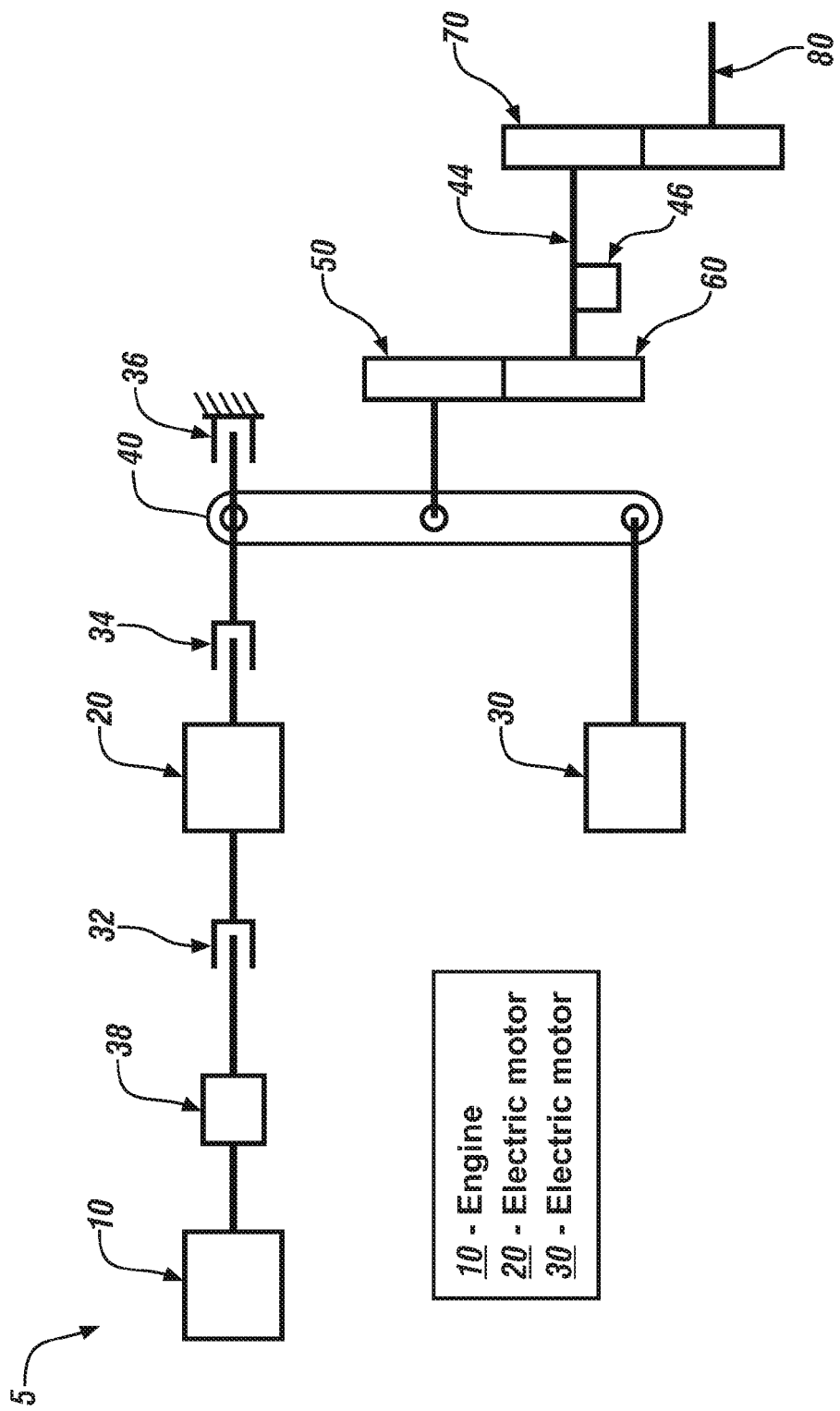
FIG. 1 schematically depicts an exemplary powertrain including a motor, in accordance with the present disclosure.

Referring now to the drawings, wherein the showings are for the purpose of illustrating certain exemplary embodiments only and not for the purpose of limiting the same, FIG. 1 schematically depicts an exemplary powertrain including a motor, in accordance with the present disclosure. Exemplary powertrain 5 includes an internal combustion engine 10, a first electric motor 20, a second electric motor 30, a planetary gear set 40, transfer gears 50, 60, and 70, and output shaft 80. Powertrain 5 can be operated in any of a number of configurations based upon selective operation of engine 10 and motors 20 and 30. Further, powertrain 5 includes clutches 32, 34, and 36 which can be engaged or disengaged to change the configuration of the powertrain. Clutch 32 selectively engages engine 10 to motor 20. Clutch 34 selectively engages motor 20 to a gear of planetary gear set 40. Clutch 36 selectively grounds the same gear of planetary gear set 40. Transmission output speed sensor 46 is depicted monitoring a speed of shaft 44 between transfer gears 60 and 70. Damper clutch 38 is depicted between engine 10 and motor 20 to provide a damping or smoothing of the interaction between the engine and the motor.

Motors 20 and 30 can supply torque to powertrain 5. According to one exemplary embodiment, engine 10 can be used to provide torque to motor 20 for the purpose of regenerating an energy storage device supplying electrical energy to motors 20 and/or 30. In such a function, supplying torque for a purpose of regeneration rather than supplying torque to the powertrain for the purpose of driving the output shaft, powertrain 5 can be described as an electric drive powertrain and engine 10 can be described as a range extender. However, the methods described herein can be utilized with hybrid drive powertrains or any powertrain utilizing an electric motor and are not limited to a powertrain utilizing the engine as a range extender.

Powertrain control can be based upon generating torque based upon a requested output torque or output torque request, describing a desired torque to be delivered to the output shaft of the powertrain. According to one exemplary control method, inputs from an operator are monitored by a control module, for example, including an accelerator pedal position, and the inputs are utilized to generate an output torque request for the powertrain. Depending upon the particular powertrain, the output torque request can be used by various control modules, including a transmission control module, a hybrid control module, an engine control module, or a motor control module, to command the various components to the powertrain to deliver torque to the output shaft according to the output torque request. Motors of a hybrid drive powertrain or an electric drive powertrain receive torque commands from a control module and operate based upon those torque commands.

Operation of a motor results in an actual motor torque. A number of factors can affect how closely the actual motor torque for a motor tracks the torque command for the motor. Some factors can indicate an anomaly with the motor. For example, a damaged or defective motor or component related to the motor might cause the motor to not deliver an actual torque approximating the torque command. On-board diagnostics methods monitor the actual torque and determine a fault of the motor based upon whether the actual torque deviates from the torque command. Further, torque security methods monitor the actual torque and determine whether remedial actions are required to preserve the output torque according to the output torque request. Motor faults, determined by either on-board diagnostics or torque security methods, can describe a factor such as a damaged motor that indicates a systemic degradation. However, a number of other factors can affect how closely the actual motor torque tracks the torque command for a motor. For example, torque command to a motor can change very rapidly. Reaction of a motor to a change in torque command includes a reaction time. If the actual motor torque is compared to the torque command while the motor is reacting to a change in the torque command, the comparison can indicate a fault of the motor system or a false fault, describing a damaged or defective motor where the motor system is functioning properly within normal reaction times for the motor. Other similar characteristics to the reaction time of the motor can be a factor in how closely the actual motor torque tracks the torque command for a motor. For example, a motor is supplied power from a power inverter, and properties of the power inverter can affect the actual torque of the motor. Similarly, a motor controller or current controller controls the power delivered to the motor, and properties of the controller can affect the actual torque of the motor. Similarly, a microprocessor within a control module or microprocessors within control modules are used to control the motor, and characteristics of the microprocessor or microprocessors can affect the actual torque of the motor. One exemplary characteristic of a microprocessor that can be utilized is discrete microprocessor processing capacity. A number of hardware devices, systems, or control methods can have characteristics that can affect the actual torque of a motor, and the disclosure is not intended to be limited to the particular exemplary embodiments provided herein. By examining or modeling the factors that can affect the actual torque of a motor when the motor and related components are working properly or within normal parameters, operation of the motor due to factors that actually indicate a damaged or defective motor or damage to other components of the system can be more accurately determined.

Under normal or steady state operation, the effects of changing torque commands might be minimal. However, under certain circumstances, motors used in hybrid drive powertrains or powertrains wherein an electric motor is coupled with an engine, torque commands to a motor can change rapidly and frequently. Motors can be used to actively dampen changes to engine torque, wherein torque commands are rapidly changed to compensate for changing engine torque. One additional exemplary circumstance includes the motor used to start or stop the engine. Starting or stopping an engine includes applying torque to the crankshaft of the engine. Crankshaft torque or the torque required to accelerate the crankshaft during a starting or stopping event is affected by the actions of the pistons, compressing cylinder charge within the cylinders of the engine, changing valve positions, and other events within the engine. Methods to utilize a motor to start or stop an engine frequently include utilizing changing actual motor torque to dampen the engine or smooth operation during the starts and stops. These methods damping the engine, including rapid changes to torque commands, create the above described conditions wherein a comparison of the torque commands to the actual motor torque can indicate false faults.

Inaccuracies based upon comparing a torque command to an actual motor torque can cause false faults, as described above. Inaccuracies can similarly cause false passes, wherein the diagnostic comparison can fail to catch substantial failures of the motor to operate as expected. False passes can occur for a number of reasons. In one non-limiting exemplary condition, if a motor includes a reaction time to changes in torque command, a solution to prevent false failures in the comparison is to widen the tolerances of conforming results to the comparison. However, while such a change to the tolerances can prevent false faults due to reaction times, the change can reduce the ability of the comparison to identify a damaged or defective motor.

A number of factors can affect the actual motor torque of a motor or motors within a powertrain. Operation of the powertrain and the components of the powertrain that can affect the actual torque of the motor or motors can be modeled to generate a predicted torque. This predicted torque will differ from the torque command by factors described by the model, for example including the reaction time of the motor and characteristics of the related components. By using the predicted torque to compare to the actual motor torque, the difference between the actual motor torque and the torque command that do not indicate a damaged or defective motor or components related to the motor can be filtered out. A method to control a powertrain including an electric motor based upon comparing the actual motor torque to the predicted torque can improve accurate identification of faults in the system and control of the motor. In this way, the predicted torque closely matching an actual motor torque of a properly functioning motor can be used to judge whether a motor is damaged or defective, preventing both false faults and false passes.

The above methods describe utilizing a model of the motor and models of the other components affecting operation of the motor to generate a predicted torque for the motor can be utilized as described above to compare to the actual motor torque and determine occurrence of a motor fault. However, a comprehensive model of a motor or other another component can be complex and computationally intensive. Depending upon the computational resources available to monitor the operation of the motor, comprehensive models of the motor and the related components can be utilized. However, not all functional aspects of a motor or the related components affect how closely the actual motor torque for a motor tracks the torque command for the motor. Key performance factors of the motor and the related components can be selected and monitored to generate the predicted torque without requiring the intensive computational requirements of the comprehensive models. For example, a phase lag time describing the reaction time of the motor can be utilized as a key performance factor. Another key performance factor can include a raising rate limitation for the motor, describing a limit to how quickly the motor torque can change. Another key performance factor can include the delay caused by limited discrete processing time.

Figure 2:
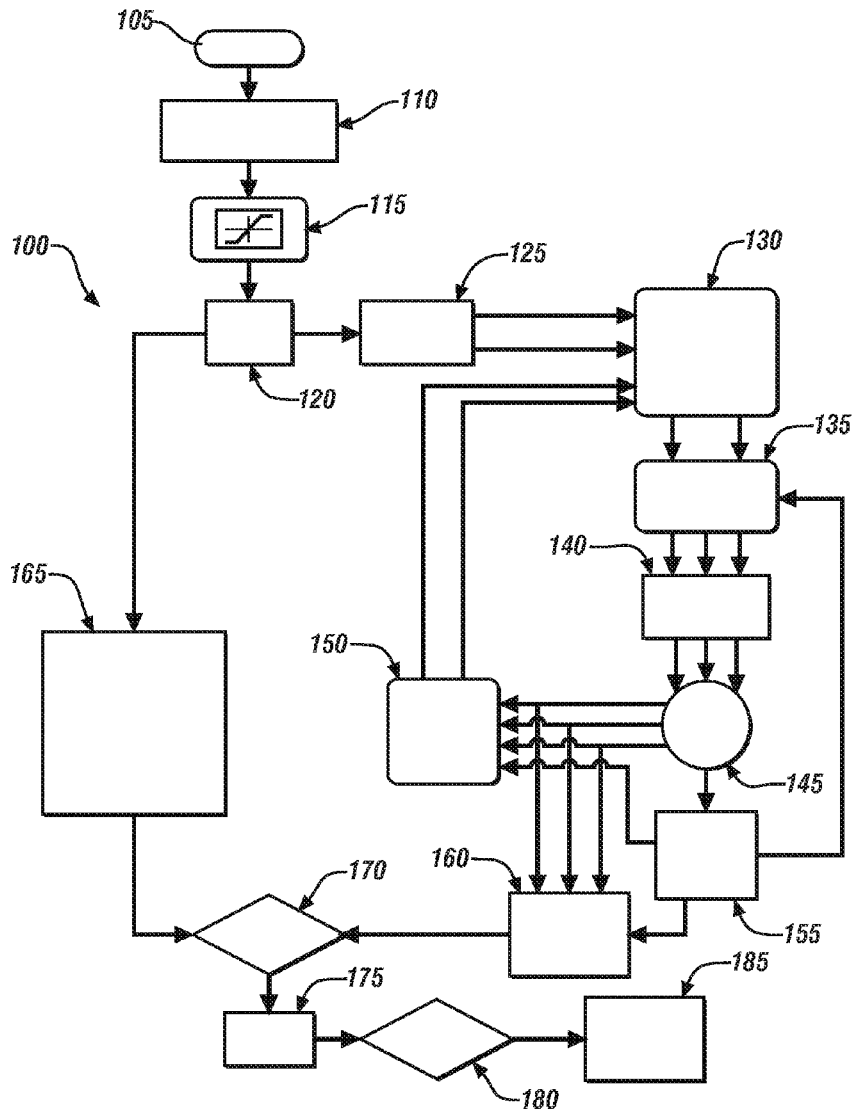
FIG. 2 schematically depicts an exemplary motor torque performance monitor, in accordance with the present disclosure.

The above methods can be utilized to operate a motor torque performance monitor, determining a predicted torque and comparing it to an actual motor torque. FIG. 2 schematically depicts an exemplary motor torque performance monitor, in accordance with the present disclosure. Table 1 describes the contents of each block of the FIG. 2.

TABLE 1

| BLOCK | FIG. 2 BLOCK CONTENTS |
|---|---|
| 105 | Start |
| 110 | Motor Torque Command From the Hybrid Controller |
| 115 | Limitation Due to Machine Capacity |
| 120 | Torque Slew Limiter |
| 125 | Motor Torque Control Table and Field Weakening |
| 130 | Synchronous Frame Current Regulator |
| 135 | PWM Modulation |
| 140 | PWM Inverter |
| 145 | Motor |
| 150 | Current Input Conversion |
| 155 | Motor Speed and Position Sensing |
| 160 | Actual Motor Torque Achieved Calculation |
| 165 | Predict the Motor Torque Achieved |
| 170 | Is the Torque Error Greater Than the Calibratable Table? |
| 175 | Debouncing Unit |
| 180 | Fault Matured? |
| 185 | Take Remedial Actions |

As described above, the torque command monitored in block 110 is compared with the actual motor torque calculated in block 160. However, such comparison fails to account for factors affecting how closely the actual motor torque for a motor tracks the torque command for the motor.

Process 100 depicting a motor controller starts in block 105. In block 110 of FIG. 2, a torque command for a motor is received. An exemplary hybrid vehicle controller will generate the torque command for each motor in the hybrid powertrain based upon factors including an accelerator pedal position, a vehicle speed, and a transmission shift position. In block 115, the motor controller determines whether the motor torque command received is within the motor torque capability limit. If the torque command is out of the motor's maximum physical torque limit, the torque command will be constrained to the limit. In block 125, based on a saved motor torque control table, the torque command is transferred to a current command (i.e., Id_command, Iq_command) in d and q axes in the synchronous frame. If the motor speed is high, then a field weakening effect additionally needs to be considered. In block 130, the motor current is controlled by the current regulator where the measured motor currents, Id and Iq, are forced to track the Id_command and Iq_command. The outputs of block 130 are a commanded voltage, Vd_command and Vq_command, in the synchronous frame. In block 135, the PWM modulation block, the commanded voltage of Vd_command and Vq_command are converted into the duty cycle commands, Da, Db, and Dc, for a three phase PWM inverter shown represented in block 140. The motor is represented in block 145, and three phase currents, Ia, Ib, and Ic, are output from block 145. In block 155, motor position sensing or, more specifically, rotor position sensing is conducted and the motor speed is calculated. The synchronous currents are output from block 150 as measured currents, Id and Iq, based the measured three phase currents, Ia, Ib, and Ic, output from block 145, and a measured rotor position and/or motor speed from block 155. In the depicted example of FIG. 2, actual motor torque is calculated in block 160 based upon rotor position and motor speed sensing from block 155 and currents of the three phases of the motor from block 145. In other embodiments, actual motor torque can be monitored or determined according to a number of different methods, and the disclosure is not intended to be limited to the particular example describing calculation of the actual motor torque. Block 165 applies the methods described herein to model the motor and related components or to model key performance factors to determine a predicted torque. Block 170 compares the actual motor torque to the predicted torque, defining the difference as a torque error, based upon a calibratable threshold. If the torque error is greater than the calibratable threshold and is debounced in block 175, then the system determines whether a fault condition is indicated or matured at block 180 and takes appropriate remedial actions at block 185.

The calibratable threshold is selected to describe a substantial fault or defective operation of the motor and can be determined experimentally, empirically, predictively, through modeling or other techniques adequate to accurately predict motor operation, and a multitude of calibration curves might be used for the same motor for different settings, conditions, or operating ranges. Determination of a fault maturing in block 180 can take a number of embodiments, for example, requiring a certain number of faults or a certain number of faults in a time period. Alternatively, faults occurring during specific circumstances can be voided or given less weight, for example, faults that occur when active damping or an engine start or stop operation is taking place. Remedial actions described in block 185 can take a number of embodiments. For example, if a chronic or substantial fault of the motor is indicated, the motor can be disabled or an indication to the operator of the vehicle can be initiated. In another example, if the motor is indicated to not be able to supply torque required to fulfill the requested output torque, the configuration of the powertrain can be adjusted to compensate, for example, by increasing torque requirements or requesting additional torque from a torque generative device other than the motor or other torque generative devices within the powertrain, adjusting transmission states, or other actions. Alternatively, the motor can be derated, compensating by reducing how much torque the controller can request of the motor. A number of remedial actions can be taken, commanded, or generated based upon identified faults, and the disclosure is not intended to be limited to the particular exemplary embodiments described herein.

The exemplary configuration of FIG. 1 includes a pair of motors. It will be appreciated that the methods described herein can be operated for a plurality of motors within the same powertrain. The plurality of motors can be controlled individually or by a common control module. The motors and the related components can be the same or similar to each other, or the motors can be sized or configured differently, depending upon the particular configuration of the powertrain. The methods above determining the predicted torque for each of the motors will include determinations or predictions specific to each motor, the related components to each motor, and all of the corresponding properties and characteristics.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a powertrain comprising an electric motor, the method comprising:
   monitoring a torque command to the motor;
   predicting a motor torque for the motor based upon the torque command, the predicting comprising,
      modeling operation of the motor based upon the torque command comprising modeling operation of components related to the motor based upon the torque command, the modeling operation of the components comprising modeling operation of a power inverter, modeling operation of a current controller, and modeling operation of a microprocessor used to control the motor, and predicting the motor torque based upon the modeled operation of the motor;

monitoring an actual motor torque of the motor;

comparing the actual motor torque to the predicted torque;

indicating a torque error when the actual motor torque and the predicted torque differ by more than a calibratable threshold;

debouncing the torque error; and determining that the torque error has matured to a motor fault, said determining including requiring a certain number of faults in a time period and voiding faults occurring during active damping, during an engine start operation and during an engine stop operation;

wherein the modeling of the motor comprises predicting an effect that connection to the powertrain comprising an engine and a transmission will have upon the motor torque.

2. The method of claim 1, wherein monitoring the actual motor torque of the motor comprises:

monitoring a speed and position of the motor; and monitoring a current of the motor.

3. The method of claim 1, wherein predicting an effect that connection to the powertrain will have upon the motor torque comprises predicting an effect that a motor function will have upon the motor torque, the motor function comprising one of dampening changes to engine torque and using the motor to start or stop the engine.

4. The method of claim 1, further comprising commanding a remedial action based upon the motor fault.

5. The method of claim 1, wherein predicting the motor torque based upon the torque command comprises:

monitoring a phase lag time for the motor; and predicting the motor torque based upon the phase lag time.

6. The method of claim 5, wherein predicting the motor torque based upon the torque command further comprises:

monitoring a raise rate limit for the motor;

monitoring a delay caused by a limited discreet processing time; and predicting the motor torque further based upon the raise rate limit and the delay caused by the limited discreet processing time.

7. The method of claim 4, wherein commanding the remedial action comprises derating the motor.

8. The method of claim 4, wherein commanding the remedial action comprises adjusting a configuration of the powertrain to compensate for the motor fault.

9. The method of claim 8, wherein adjusting the configuration of the powertrain comprises requesting additional torque from a torque generative device other than the motor.

10. The method of claim 8, wherein adjusting the configuration of the powertrain comprises adjusting a transmission state.

11. Method to control a powertrain comprising a plurality of electric motors, the method comprising:

monitoring a torque command to each of the motors;

predicting a torque for each of the motors based upon the torque command, the predicting comprising, modeling operation of each of the motors based upon the torque commands comprising modeling operation of components related to each of the motors based upon the torque commands, the modeling operation of the components comprising modeling operation of a power inverter for each of the motors, modeling operation of a current controller for each of the motors, and modeling operation of a microprocessor used to control each of the motors, and predicting the motor torques based upon the modeled operation of the motors;

monitoring an actual motor torque of each of the motors;

comparing the actual motor torque to the predicted torque for each of the motors;

indicating a torque error for each of the motors based upon the comparing indicating that the actual motor torque and the predicted torque differ by more than a calibratable threshold;

debouncing the torque error for each of the motors; and determining that the torque error has matured to a motor fault for each of the motors, said determining including requiring a certain number of faults in a time period and voiding faults occurring during active damping, during an engine start operation and during an engine stop operation;

wherein the modeling each of the motors comprises predicting an effect that connection to the powertrain comprising an engine and a transmission will have upon the motor torques.

12. Apparatus for controlling a powertrain comprising an electric motor, comprising:

the motor;

a control module configured to:

monitor a torque command to the motor;

predict a torque for the motor based upon the torque command, the predicting comprising, modeling operation of the motor based upon the torque command comprising modeling operation of components related to the motor based upon the torque command, the modeling operation of the components comprising modeling operation of a power inverter, modeling operation of a current controller, and modeling operation of a microprocessor used to control the motor, and predicting the motor torque based upon the modeled operation of the motor;

monitoring an actual motor torque of the motor;

comparing the actual motor torque to the predicted torque;

indicating a torque error based upon the comparing indicating that the actual motor torque and the predicted torque differ by more than a calibratable threshold;

debouncing the torque error; and determining that the torque error has matured to a motor fault, said determining including requiring a certain number of faults in a time period and voiding faults occurring during active damping, during an engine start operation and during an engine stop operation;

wherein the modeling of the motor comprises predicting an effect that connection to the powertrain comprising an engine and a transmission will have upon the motor torque.

13. The apparatus of claim 12, wherein determining the predicted torque for the motor based upon the torque command comprises:

monitoring a phase lag time for the motor; and determining the predicted torque for the motor based upon the phase lag time.

14. The apparatus of claim 13, wherein determining the predicted torque for the motor based upon the torque command further comprises:

monitoring a raise rate limit for the motor;
monitoring a delay caused by a limited discreet processing time; and
determining the predicted torque for the motor further based upon the raise rate limit and the delay caused by the limited discreet processing time.

15. The apparatus of claim 12, further comprising:

the power inverter;
the current controller; and
the microprocessor.

* * * * *